United States Patent
Novak, Jr. et al.

(10) Patent No.: US 6,637,943 B2
(45) Date of Patent: Oct. 28, 2003

(54) HUB ASSEMBLY FOR AUTOMOTIVE VEHICLES

(75) Inventors: David A. Novak, Jr., Summit County, OH (US); Ronnie D. Morr, Stark County, OH (US)

(73) Assignee: The Timkem Company, Canton, OH (US)

( * ) Notice: Subject to any disclaimer, the term of this patent is extended or adjusted under 35 U.S.C. 154(b) by 0 days.

(21) Appl. No.: 10/198,325

(22) Filed: Jul. 18, 2002

(65) Prior Publication Data

US 2002/0181817 A1 Dec. 5, 2002

Related U.S. Application Data

(62) Division of application No. 09/472,489, filed on Dec. 27, 1999, now Pat. No. 6,464,399.

(51) Int. Cl.⁷ .......................... F16C 33/76; B60B 27/00
(52) U.S. Cl. .................. 384/477; 384/478; 384/589; 301/105.1
(58) Field of Search .............................. 384/477, 478, 384/480, 484, 485, 486, 544, 589, 537, 559, 585; 277/549, 562, 572; 301/105.1

(56) References Cited

U.S. PATENT DOCUMENTS

| | | |
|---|---|---|
| 2,733,081 A | 1/1956 | Saywell |
| 3,163,476 A | 12/1964 | McKinven, Jr. |
| 3,363,911 A | 1/1968 | McKinven, Jr. |
| 3,510,138 A | 5/1970 | Bowen |
| 4,269,459 A | 5/1981 | Peck |
| 4,417,643 A | 11/1983 | Guimbretiere |
| 4,427,242 A * | 1/1984 | Otto ............................ 384/486 |
| 4,428,630 A | 1/1984 | Folger et al. |
| 4,784,441 A | 11/1988 | Welschof et al. |
| 4,798,560 A | 1/1989 | Farrell |
| 4,944,611 A | 7/1990 | Ankenbauer et al. |
| 4,969,694 A | 11/1990 | Caron |
| 5,009,525 A | 4/1991 | Brockmüller et al. |
| 5,022,659 A | 6/1991 | Otto |
| 5,242,229 A | 9/1993 | McLarty |
| 5,292,199 A | 3/1994 | Hosbach et al. |
| 5,490,732 A * | 2/1996 | Hofmann et al. ............ 384/537 |
| 5,813,675 A * | 9/1998 | Otto ............................ 277/549 |
| 5,816,711 A | 10/1998 | Gingrich |
| 5,941,335 A * | 8/1999 | Krisher ........................ 180/255 |
| 5,979,903 A * | 11/1999 | Kwasniewski ............... 277/549 |
| 6,003,876 A * | 12/1999 | Yamagishi et al. .......... 277/549 |
| 6,007,253 A * | 12/1999 | Rutter .......................... 384/544 |
| 6,062,737 A * | 5/2000 | Thienes ....................... 384/589 |

FOREIGN PATENT DOCUMENTS

| | | | |
|---|---|---|---|
| DE | 2322458 | | 11/1974 |
| EP | 0475088 | | 3/1992 |
| EP | 0913693 | | 5/1999 |
| FR | 2162072 | | 7/1973 |
| JP | 7-174147 | A * | 7/1995 |
| WO | 9858762 | | 12/1998 |

* cited by examiner

Primary Examiner—William C Joyce
(74) Attorney, Agent, or Firm—Polster, Lieder, Woodruff & Lucchesi, L.C.

(57) ABSTRACT

A steering knuckle is supported on a road wheel of an automotive vehicle by a hub assembly which includes a housing fitted into a bore in the knuckle and hub having a flange to which the road wheel is attached and also a spindle which projects from the flange into the housing. The bearing has cones which fit over the spindle between a shoulder on the hub flange and an integrally formed abutment on the other end of the spindle. The ends of the bearing contain seals which exclude contaminants from the interior of the bearing. A slinger is fitted to the spindle and may be captured between the cone at the inboard end of the bearing and the abutment. The slinger extends outwardly past the spindle abutment and seal at the inboard end of the bearing and has a circular peripheral edge which lies close to the surface of the bore in the steering knuckle, thus providing an additional barrier to exclude contaminants from the bearing.

12 Claims, 3 Drawing Sheets

HUB ASSEMBLY FOR AUTOMOTIVE VEHICLES

CROSS REFERENCE TO RELATED APPLICATIONS

This application is a division of U.S. application Ser. No. 09/472,489 filed Dec. 27, 1999. now U.S. Pat. No. 6,464,399

STATEMENT REGARDING FEDERALLY SPONSORED RESEARCH OR DEVELOPMENT

Not Applicable.

BACKGROUND OF THE INVENTION

This invention relates in general to hub assemblies for automotive vehicles and more particularly to hub assembly that better excludes contaminants from its interior.

Various arrangements exist for mounting the road wheels of automotive vehicles on the suspension systems of such vehicle. One arrangement relies on a dead spindle which projects from the suspension system—usually from a steering knuckle—into a hub to which a road wheel is bolted. The hub rotates around the spindle on antifriction bearings that are located between the hub and the spindle. In another arrangement, the hub to which the road wheel is bolted has a live spindle which projects into a housing which in turn is bolted to a steering knuckle or other suspension system component. An antifriction bearing located between the spindle and housing enables the spindle—and indeed the entire hub—to rotate relative to the housing.

The latter finds widespread use on four wheel drive vehicles and on front wheel drive vehicles, inasmuch as the spindle is easily coupled with a constant velocity joint at the end of a drive shaft. Yet it operates just as well with nondriven wheels, particularly the front wheels of rear wheel drive sport utility vehicles and light trucks. Thus, automobile manufacturers can offer four wheel drive vehicles and rear wheel drive only vehicles without changing the type of hub assembly for the front wheels.

Irrespective of the arrangement, the bearings that are located around the spindle must have barriers of one type or another to exclude contaminants from them. With a dead spindle, typically a seal is fitted to the inboard end of the hub, and it wipes a wear surface on the spindle. An end cap is pressed into the outboard end of the hub. With a live spindle used for a nondriven wheel, the outboard end of the bearing contains a live seal. Likewise, the inboard end of the bearing may be fitted with a live seal or the inboard end of the housing or the steering knuckle itself may be fitted with a cover that isolates inboard end of the bearing, but this increases the expense of hub assembly. On the other hand, when the live spindle is coupled to a drive shaft through a constant velocity (CV) joint, both the inboard and outboard ends of the bearing require live seals. Thus, to avoid variances between the front wheel hub assemblies for two and four wheel drive vehicles, some manufacturers choose to furnish all such hub assemblies with the seals at the inboard ends of their bearings.

At the outboard end of the typical hub assembly, the nearby flange and the brake disk which is attached to it rotate and serve to fling contaminants away from outboard end of the bearing. This supplemental protection does not exist at the inboard end. With four wheel drive vehicles the CV joints provide a measure of protection for the inboard ends of the bearings at the steering knuckles, in that they provide surfaces which function as slingers. But this does not hold true for the inboard ends of the bearings in the steering knuckles of two wheel drive vehicles.

BRIEF DESCRIPTION OF THE SEVERAL VIEWS OF THE DRAWINGS

In the accompanying drawings which form part of the specification and wherein like numerals and letter refer to like parts wherever they occur.

DETAILED DESCRIPTION OF INVENTION

Figure 1:
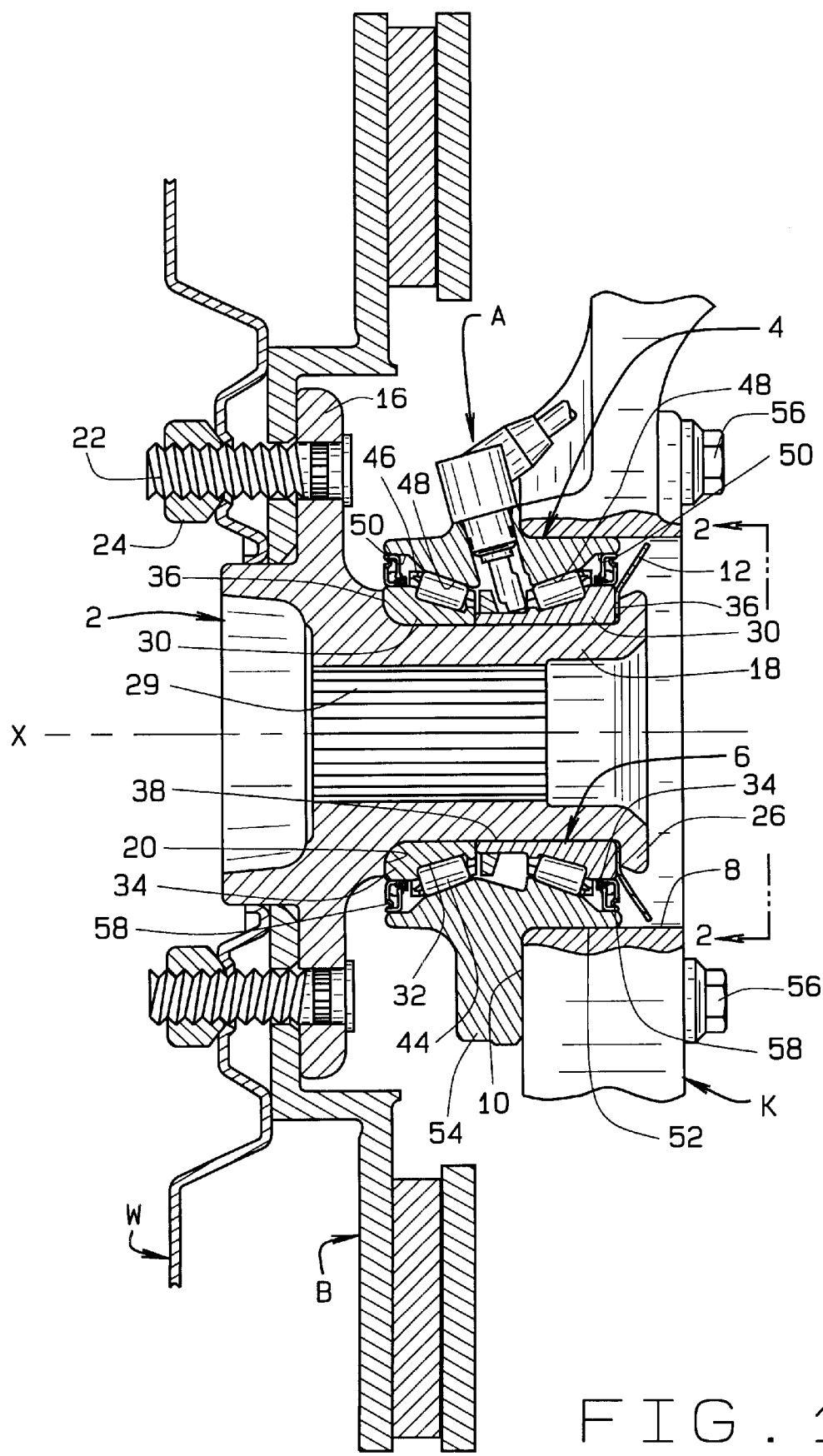
FIG. 1 is a sectional view of a hub assembly constructed in accordance with and embodying the present invention, with the hub assembly having a slinger that forms part of the invention and further being fitted to a steering knuckle and having a brake disk and road wheel mounted on it.

Referring now to the drawings (FIG. 1), a hub assembly A enables a road wheel W to rotate about an axis X on a steering knuckle K or other component of an automotive suspension system. The hub assembly A also carries a brake disk B which rotates with the wheel W. The hub assembly A includes a hub 2 to which the road wheel W and brake disk B are secured, a housing 4 which is mounted on the steering knuckle K, and a bearing 6 which is located between the hub 2 and housing 4 and enables the hub 2 to rotate on the housing 4 with minimum friction. To accommodate the housing 4, the steering knuckle K is provided with a through bore 8 and a machined end face 10. The housing 4 fits partially into the bore 8 and against the end face 10. The hub 2 projects into the housing 4, indeed, far enough so that its end is located within the bore 8 of the knuckle K. Here the hub 2 is fitted with a barrier member in the form of slinger 12 which serves to divert contaminants from the interior of the housing 4 and the bearing 6 that is within the housing 4.

More specifically, the hub 2 includes (FIG. 1) a flange 16 and a hollow spindle 18 which projects from the flange 16 at a shoulder 20 located on the back face of the flange 16. Outwardly from the shoulder 20, the flange 16 is fitted with lug bolts 22 which project axially from its other face. The brake disk B fits against the flange 16 and the road wheel W against the disk B with the lug bolts 22 projecting though each of them. Beyond the wheel W, lug nuts 24 are threaded over the bolts 22 to secure the disk B and wheel W to the hub 2.

At its end remote from the flange 16, the spindle 18 is upset, that is, deformed outwardly in the provision of a formed end 26 having an abutment face 28 (FIG. 3) that lies perpendicular to the axis X and is presented toward the shoulder 20. The bearing 6 and the slinger 12 are captured between the shoulder 20 on the flange 16 and the face 28 of the formed end 26. Thus, the formed end 26 serves as an abutment. Internally, the spindle 18 contains a spline 29.

The bearing 6 includes (FIG. 1) an inner race in the form of two cones 30 which fit around the spindle 18, there being an interference fit between each cone 30 and the spindle 18. Each cone 30 has a tapered raceway 32 that is presented outwardly away from the axis X, a thrust rib 34 at the large end of its raceway 32, and a back face 36, which is squared off with respect to the axis X on the end of the thrust rib 34. The inboard cone 30 is somewhat longer than the outboard cone 30 by reason of a cylindrical cone extension 38 which projects beyond the small end of its raceway 32. The cone extension 38 may serve as a seat for a target wheel that is monitored by a speed sensor. The inboard cone 30 at its cone extension 38 abuts the small end of the outboard cone 30 along the spindle 18, that is to say, the two cones 30 abut at their front faces. The back face 36 of the outboard cone 30 abuts the shoulder 20 that lies along the flange 16.

Figure 3:
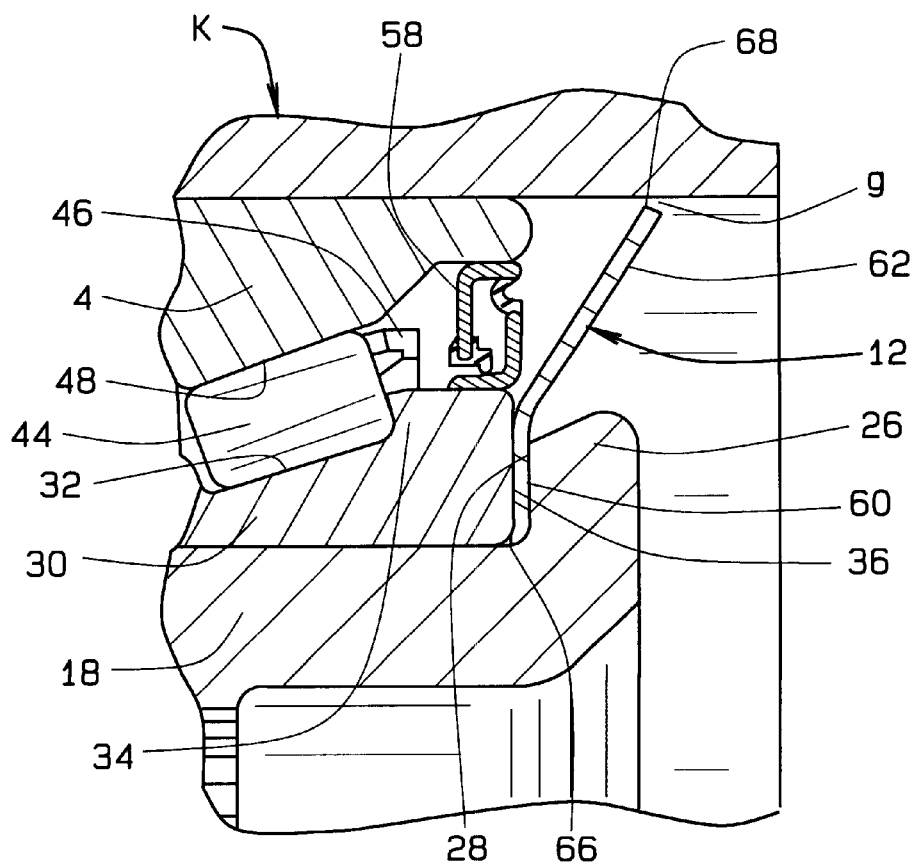
FIG. 3 is an enlarged sectional view of the formed end of the spindle for the hub assembly and the slinger captured on that end.

The slinger 12 fits around the spindle 18 with its one face against the back face 36 of the inboard cone 30 and its other face against the abutment face 28 on the formed end 26 (FIGS. 1 and 3). In other words, the slinger 12 lies captured between the inboard cone 30 and the formed end 26.

In addition to the cones 30, the bearing 6 includes (FIG. 1) tapered rollers 44 arranged in two rows, there being a separate row around each cone 30. Actually, the rollers 44 extend around the raceways 32 for the cones 30, there being essentially line contact between the tapered side faces of the rollers 44 and raceways 32. The large end faces of the rollers 44 bear against the thrust ribs 30. The rollers 44 of each row are essentially on apex, which means that the envelopes in which their tapered side faces lie have their apices located at a common point along the axis X. Each row of rollers 44 has a cage 46 to maintain the proper spacing between the rollers 44 in that row.

The housing 4 surrounds the spindle 18 as well as the two cones 30 and the two rows of rollers 44 (FIG. 1). It forms part of the bearing 6 in that it has tapered raceways 48 which are presented inwardly toward the axis X. In that sense, the housing 4 constitutes the outer race of the bearing 6. The raceways 48 on the housing 4 taper downwardly toward an intervening surface which separates them. The rollers 44 likewise lie along the raceways 48 of the housing 4, there being essentially line contact between the raceways 48 and the tapered side faces of the rollers 44. At their large ends, the raceways 48 open into short end bores 50 in which the thrust ribs 34 of the two cones 30 are located. Thus, each end of the bearing 6 has an annular space, with that space being between the thrust rib 34 at that end and the surrounding surface of the end bore 50.

The housing 4 has an exterior surface 52 that is generally cylindrical and also a triangular or rectangular flange 54 that projects from the surface 52 generally midway between its ends. In the region behind the flange 54, the diameter of the surface 52 is slightly less than the diameter of the through bore 8 in the steering knuckle K. This portion of the housing 4 fits into the bore 8, while the back face of the flange 54 bears against the end face 10 on the steering knuckle K. The housing 4 is secured firmly to the steering knuckle K with bolts 56 that pass through the latter and thread into the flange 54 on the former.

The annular spaces at the ends of the bearing 6 are closed with seals 58 which fit into the end bores 50 of the housing 4 and around the thrust ribs 34 of the cones 30. U.S. Pat. No. 5,022,659 discloses suitable seals for both locations.

The formed end 26 unitizes the hub assembly A. But the hub 2 does not always have the formed end 26. Initially, the spindle 18 of the hub 2 extends from the shoulder 20 all the way to its free end as a cylindrical surface. The two cones 30 with their complements of rollers 44 and the housing 4 captured between the rollers 44 of the two rows are installed over the cylindrical surface of the spindle 18 and advanced until the back face 36 of the outboard cone 30 comes against the shoulder 20 at the other end of the spindle 18. Thereafter, the slinger 12 is installed over the end of the spindle 18 and brought against the back face 36 of the inboard cone 30. A portion of the spindle 18 projects beyond the slinger 12. This portion is deformed into the formed end 26. PCT application GB 98/01823 (International Publication No. WO98/58762), discloses a rotary forming process for upsetting the initially extended end of the spindle 18 and converting that end into integral formed end 26 which captures the cones 30 and slinger 12 on the spindle 18 and in effect unitizes the entire hub assembly A.

Other means may secure the two cones 30 on the spindle 18 as well. For example, the end of the spindle 18 may have threads and a nut engaged with those threads and turned down against the slinger 12. Also the end of the spindle 18 may have a groove and snap ring fitted to the groove.

When the hub assembly A is so unitized, its bearing 6 exists in a condition of slight preload. Actually the spacing between the inner raceways 32 on the cones 30 determines the setting of the bearing 6, and that spacing depends on the length of the cone extension 38 for the inboard cone 30, inasmuch as the rotary forming procedure which produces the formed end 26 drives the inboard cone 30 toward the outboard cone 30 with enough force to cause the cone extension 38 on the former to abut the small end of the latter.

Figure 2:
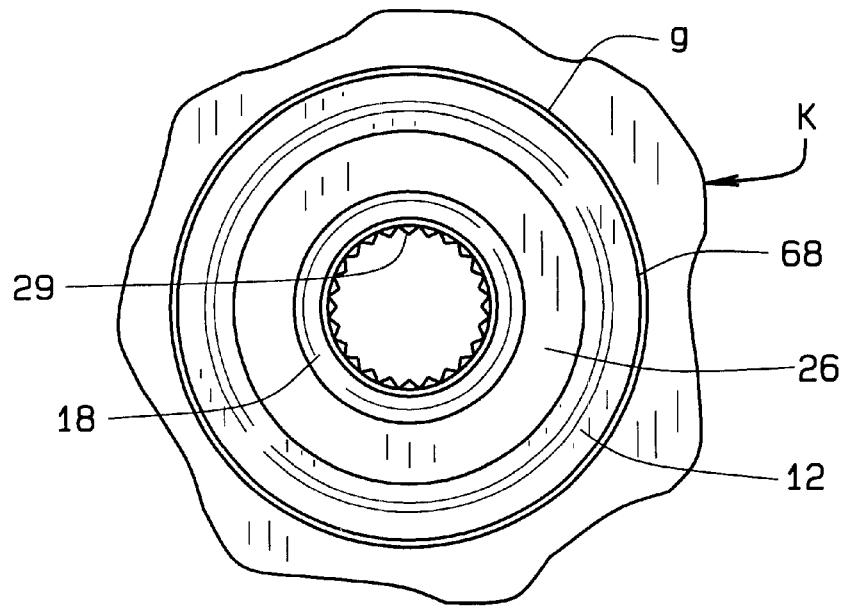
FIG. 2 is an end view of the hub assembly taken along line 2—2 of FIG. 1.

The slinger 12, which constitutes a barrier member, includes (FIG. 2) an inner region 60 and an outer region 62 which are formed integral, preferably as a metal stamping. The inner region 60 lies in a plane that is perpendicular to the axis X. The outer region 62, on the other hand, lies oblique to the axis X and is therefore offset axially from the inner region 60 and away from the end of the bearing 6. the inner region 60 has a circular margin 66, the diameter of which is only slightly larger than the outer diameter of the spindle 18, so that the slinger 12 will pass easily over the spindle 18, yet remain centered, before the end of the spindle 18 is deformed. Along the margin 66, the inner region 60 may be flat or it may be contoured to conform to the radius where the bore of the inboard cone 30 opens out of the back face 36 of that cone 30. In any event, the inner region 60 fits around the spindle 18 where it is clamped tightly between the back face 36 of the inboard cone 30 and the abutment face 28 of the formed end 26. If the inner region 60 at its inner margin 66 does not, upon installation, conform to the radius at the end of the bore for the cone 30, it will afterwards, owing to force applied in the forming operation which produces the formed end 26. The outer region 62 extends obliquely away from the bearing 6 and generally encircles the formed end 36. It lies axially beyond the inboard seal 58 and also beyond the inboard end of the housing 4. It terminates at a peripheral edge 68 which is circular and has its center at the axis X. The edge 68 lies close to the surface of the bore 8 in the knuckle K, but does not contact that surface, there being a gap g (FIGS. 2 and 3) between the edge 68 and the surface of the bore 8.

When the road wheel W rotates, the spindle 18 of the hub 2 revolves within the housing 4 on the bearing 6, all with minimal friction and wobble. The hub assembly A, through the bearing 6 within it, transfers radially directed loads—in essence the weight of the vehicle—from the steering knuckle to the wheel W and also thrust or axial loads essentially inertial loads produced by negotiating turns. The seals 58 create live fluid barriers at the ends of the bearing 6 and prevent road contaminants, such as water, dust, mud and ice-melting chemicals, from entering the bearing 6 where they might damage the raceways 32 and 48 and the tapered rollers 44. The slinger 12 provides an extra measure of protection for the inboard end of the bearing 6. Not only does it reduce the exposure of the inboard seal 58 to contaminants, but its rotation with the hub 2 and road wheel W drives contaminants radially outwardly to the surface of the bore 8 and then axially away from the inboard seal 58. The slinger 12 does not obstruct the spline 29 for the spindle 18 so the hub assembly A will accommodate a CV joint. To a measure the rotating flange 16 of the hub 2 and the rotating brake disk B serve as slinger for deflecting contaminants from the outboard seal 58.

The bearing 6, instead of being a tapered roller bearing, may be an angular contact ball bearing. In that case the rolling elements would be balls and the raceways in the housing and on the cones would be arcuate in cross section.

Figure 4:
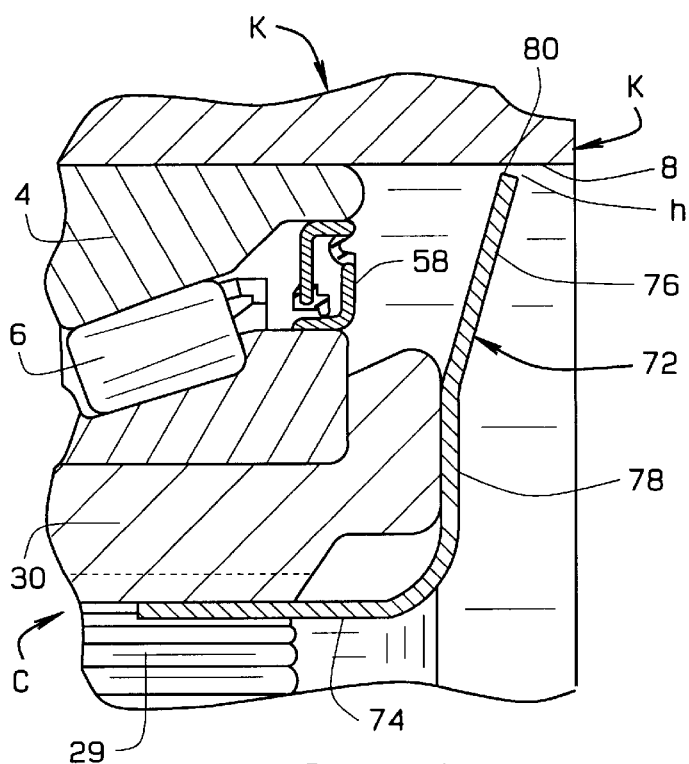
FIG. 4 is an enlarged sectional view of the hub assembly with a modified slinger.

A modified hub assembly C (FIG. 4), has a hub 2, housing 4 and bearing 6 that are essentially the same as their counterparts in the hub assembly A. However, the formed end of the spindle 18 along its abutment face 28 bears directly against the back face 36 of the inboard cone 30. Moreover, the spline 29 in the spindle 18 extends out to the formed end 26. The spindle 18 carries a slinger 72 which projects outwardly toward the surface of the bore 8 in the steering knuckle K.

The slinger 72 includes an axially directed mounting portion 74, and obliquely directed outer portion 76 and a generally radially directed intermediate portion 78, all three of which are formed integral as a metal stamping or plastic molding. The axially directed mounting portion 74 resembles a sleeve, it being hollow and cylindrical in cross-section. It fits into the spline 29 of the spindle 18 with a light interference fit. There it bears against the inwardly presented edges on the ribs of the spline 29. In comparison to a purely cylindrical surface, the spline 29 accommodates tighter tolerances and affords a more consistent interference fit. The intermediate portion 78 projects generally radially outwardly from the end of the mounting portion 74 lies along the end face of the formed end 26. As such, the intermediate portion 78 limits the distance that the mounting portion 74 may advance into the spline 29 of the spindle 18. The outer portion 76 merges with the intermediate portion behind the formed end 26, and is disposed obliquely with respect to the axes X, it being closer to the bearing 6 at its merger with the intermediate portion 78 than elsewhere. The outer portion 76 terminates at a circular peripheral edge 80 which is concentric to the surface of the bore 8 in the housing 4, yet is spaced from that surface, there being a gap h between the surface and the peripheral edge 80.

The hub assembly C finds utility with nondriven wheels having live spindles. To install the slinger 72 in the bearing assembly, the bearing 6 including its housing 4 and hub 2 are first assembled, and the end of the spindle 18 is upset to provide the formed end 26. This captures the bearing 6 and housing 4 on the hub 2. Then, the mounting portion 74 of the slinger 72 is aligned with the spline 29 in the hollow interior of the spindle 18 and an axially directed force is applied to the slinger 72 along the back of its intermediate portion 78. The force drives the sleeve-like mounting portion 74 into the spline 29 of the spindle 18 where it remains, owing to the interference fit.

In use, the slinger 72 rotates beyond the inboard end of the bearing 6 and deflects contaminants that come against it, outwardly to the surface of the bore 8 in the steering knuckle K. The contaminants migrate along the surface of the bore 8 until they reach the end of the bore 8, whereupon they leave the steering knuckle K.

Figure 5:
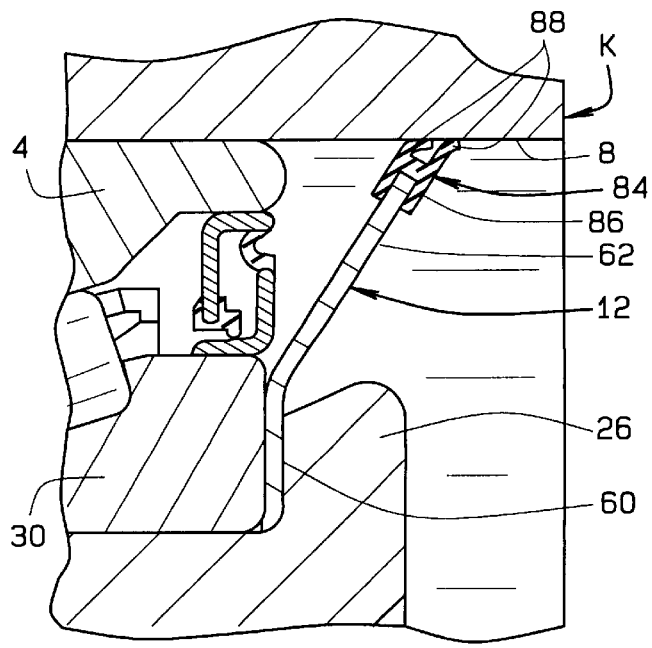
FIG. 5 is an enlarged sectional view of the hub assembly with its slinger fitted with an elastomeric seal element.
Figure 6:
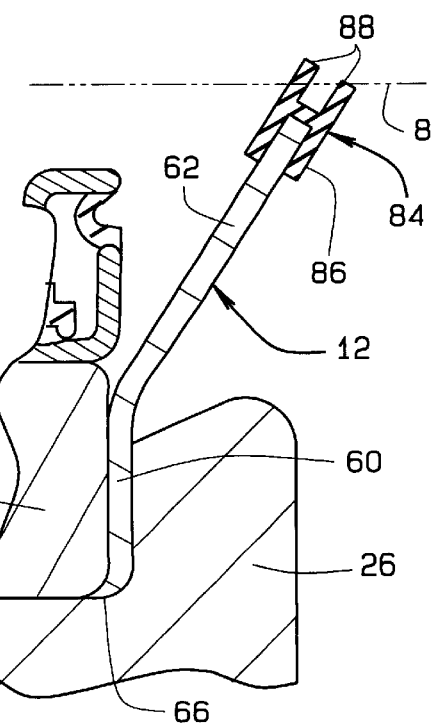
FIG. 6 is an enlarged sectional view of the slinger of FIG. 5 with its seal element undistorted by the bore surface that it normally wipes.

Either one of the slingers 12 or 72 may be fitted with an elastomeric seal element 84 (FIGS. 5 and 6) which bears against the surface of the bore 8 to further isolate the inboard end of the bearing 6 from contaminants. With respect to the slinger 12, its peripheral edge 68 is set somewhat further inwardly from the surface of the bore 8 in order to accommodate the seal element 84 which is considerably larger than the gap g. the seal element 84 includes a mounting portion 86 which is bonded to the slinger 12 along the peripheral edge 68 and also along the nearby surfaces of the oblique outer region 62. As such, the mounting portion 86 fits over the outer region 62 of the slinger 12 at the peripheral edge 68. In addition, the seal element 84 has two seal lips 88 which project outwardly from the mounting portion 84.

The lips 88 bear against and indeed are deflected by the surface of the bore 8 in the steering knuckle K. As such, they further enhance the fluid barriers established by the slinger 12. Indeed, the slinger 12 together with the seal element 84 completely isolate the inboard end of the bearing 6.

In a like manner, the seal element 84 may be installed on the slinger 72.

What is claimed is:

1. In combination with a road wheel and an automotive suspension system component having a bore that opens laterally, a hub assembly for supporting the suspension system component on the road wheel as the road wheel rotates about an axis rotation, said hub assembly comprising:

a housing attached to the suspension system component and extending into the bore of suspension system component without fully occupying the bore;

a hub having flange to which the road wheel is attached and a spindle projecting from the flange i p to the housing, with the spindle and flange being integral at one end of the spindle and with the spindle being provided with a formed end that is an integral part of the spindle and is directed radially outwardly with respect to the axis at the other end of the spindle;

an antifriction bearing located between the spindle and the housing for enabling the hub to rotate relative to the housing with minimal friction, the bearing including an inner race that is formed separate and apart from the hub and is located around the spindle between the flange and formed end and within the housing such that an annular space exists between the inner race and housing, the inner race having an inner raceway that is presented away from the axis, the bearing also including an outer raceway that is carried by the housing and is presented inwardly toward the raceway on the inner race, the bearing further including rolling elements arranged in a row between the inner and outer raceways; and a slinger located around the spindle where it is captured tightly between the inner race an the formed end, the slinger projecting outwardly away from the spindle and having its periphery in close proximity to the surface of the bore in the suspension system component.

2. The combination according to claim 1 and further comprising a seal located in the annular space between the inner race and the housing where it is interposed between the rolling elements of the bearing and the slinger for establishing a dynamic fluid barrier in the annular space.

3. The combination according to claim 1 wherein the inner and outer raceways a e oblique to the axis and the inner race has a back face which is presented tow rd the formed end.

4. The combination according to claim 3 wherein the slinger is captured between he back face of the inner race and the formed end.

5. A hub assembly for coupling a road wheel to a suspension system component so that the road wheel can rotate about an axis, said hub assembly comprising:

a hub having spindle and a flange formed integral with the spindle at one end of the spindle, with the flange being configured for attachment of the road wheel to it, the spindle at its other end being provided with a formed end that is an integral part of the spindle and is directed outwardly away from the axis, the formed end having an abutment face that is presented toward the flange:

a housing surrounding the spindle;

a bearing located between the spindle and the housing and including an inner race that is formed separate and apart from the spindle and has an inner raceway that is presented outwardly away from the axis and a back face that is presented toward the abutment face on the formed end, the bearing also including an outer raceway carried by the housing and, presented inwardly toward the raceway on the inner race, the bearing further having rolling elements organized in a row between and contacting the inner and outer raceways;

a seal located between the inner race and the housing beyond the raceways and rolling elements and effecting a dynamic fluid barrier that excludes contaminants from the raceways and rolling elements; and a slinger located around the spindle where it is captured snugly between the back face of the inner race and the abutment face of the formed end, the slinger being directed outwardly past the seal so that the seal is located between the rolling elements and the slinger, whereby the slinger impedes contaminants from reaching the seal.

6. A hub assembly according to claim 5 wherein slinger has an inner region where it is captured between the back face of the inner race and the abutment face of the formed end and an outer region located radially outwardly beyond the inner region; and wherein the inner region is substantially planar and lies in a plane perpendicular to the axis.

7. A hub assembly according to claim 6 wherein the outer region is oblique to the axis and flares away from the seal.

8. A hub assembly according to claim 5 wherein the spindle is hollow.

9. A hub assembly according to claim 8 wherein the spindle contains a spline within its hollow interior.

10. A hub assembly according to claim 5 wherein the inner and outer raceways are tapered; wherein the inner race has a thrust rib at the large end of the inner raceway; wherein the rolling elements are tapered rollers having tapered side faces that are against the tapered raceways and large end faces that are against the thrust rib; and wherein the seal fits around the thrust rib of the inner race.

11. A hub assembly according to claim 10 wherein the outer race has an end bore located beyond the large end of its tapered raceway, and the seal fits into the end bore.

12. In combination with a road wheel and an automotive suspension system component having a bore that opens laterally, a hub assembly for supporting the suspension system component on the road wheel as the road wheel rotates about an axis rotation, said hub assembly comprising:

a housing attached to the suspension system component and extending into the bore of suspension system component;

a hub having a flange to which the road wheel is attached and a spindle projecting from the flange into the housing where the spindle is provided with a formed end that is an integral part of the spindle and is directed radially outwardly with respect to th axis;

an antifriction bearing located between the spindle and the housing for enabling the hub to rotate relative to the housing with minimal friction, the bearing including an inner race that is located around the spindle between the flange and formed end and within the housing such that an annular space exists between the inner race and housing, the inner race having a raceway that is presented away from the axis, the bearing also including an outer raceway that is carried by the housing and is presented inwardly toward the raceway on the inner race, the bearing further including rolling elements arranged in a row between the inner and outer raceways; and a slinger located around the spindle where it is captured between the inner race and the formed end, the slinger projecting outwardly past the annular space between the inner race and the housing and having its periphery in close proximity to the surface of the bore in the suspension system component, the portion of the slinger toward which the annular space between the inner race and housing opens being oblique to the axis such that the slinger flares away from the inner race and is oblique to the surface of the bore where it approaches that surface.

* * * * *

UNITED STATES PATENT AND TRADEMARK OFFICE
CERTIFICATE OF CORRECTION

PATENT NO. : 6,637,943 B2
DATED : October 28, 2003
INVENTOR(S) : David A. Novak, Jr. and Ronnie D. Morr It is certified that error appears in the above-identified patent and that said Letters Patent is hereby corrected as shown below:

Column 6,
Line 34, replace "i p to" with -- into --
Line 55, replace "an" with -- and --

Signed and Sealed this

Sixteenth Day of March, 2004

JON W. DUDAS
*Acting Director of the United States Patent and Trademark Office*